(No Model.)

E. WAGNER, Jr.
CHEESE VAT.

No. 416,766. Patented Dec. 10, 1889.

Witnesses.

Inventor.

UNITED STATES PATENT OFFICE.

ERNST WAGNER, JR., OF MANITOWOC, WISCONSIN, ASSIGNOR OF ONE-HALF TO WILLIAM RATHSACK, OF SAME PLACE.

CHEESE-VAT.

SPECIFICATION forming part of Letters Patent No. 416,766, dated December 10, 1889.

Application filed March 7, 1889. Serial No. 302,304. (No model.)

*To all whom it may concern:*

Be it known that I, ERNST WAGNER, Jr., of Manitowoc, in the county of Manitowoc and State of Wisconsin, have invented new and useful Improvements in Cheese-Vats; and I do hereby declare the following to be a full, clear, and exact description of said invention, reference being had to the accompanying drawings, and to the letters of reference marked thereon, which form a part of this specification.

My invention relates to improvements in cheese-vats.

The object of my invention is to provide a vat which, as its contents is nearly drawn off, may be so inclined that the fluid therein will all flow to the discharge end.

The construction of my invention is explained by reference to the accompanying drawings, in which—

Figure 1:
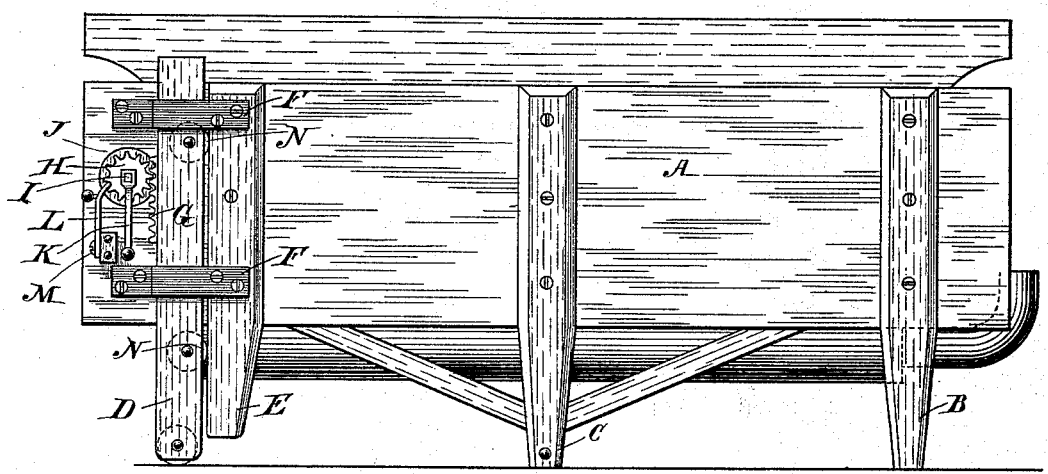
Figure 2:
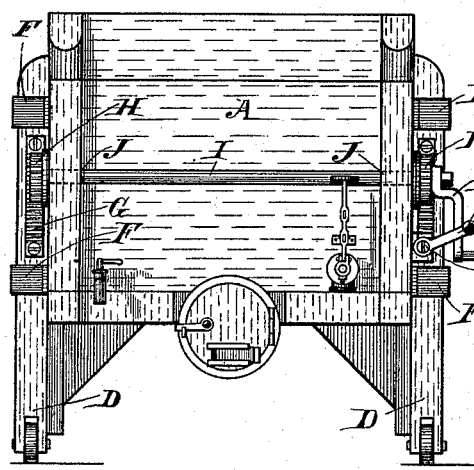
Figure 3:
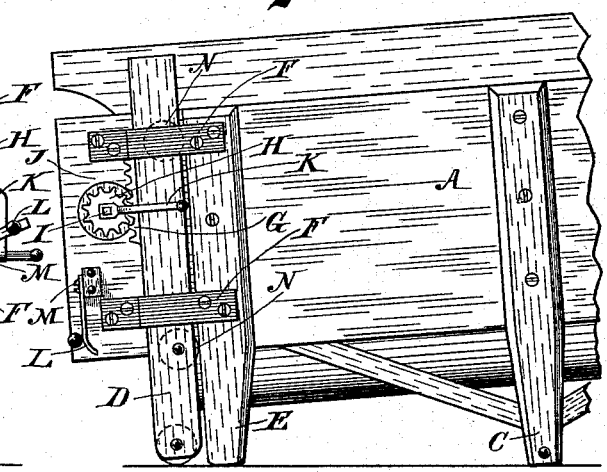

Figure 1 represents a side view thereof, showing the vat in a horizontal position. Fig. 2 is an end view, and Fig. 3 is also a side view showing the vat in its inclined position.

Like parts are represented by the same reference-letters throughout the several views.

A is the vat, which, when it is supported in a level horizontal position, rests upon the stationary legs B C and the adjustable legs D. When, however, the vat is inclined for the purpose of drawing off the last of its contents, the legs D are thrown upward, as hereinafter described, and the vat is permitted to rest upon the stationary legs C and E in the position shown in Fig. 3. The movable legs D are secured to the side of the vat by retaining-brackets F F, through which they are free to move upward and downward. To one side of the movable legs D are affixed toothed bars G, into which pinions H H are adapted to mesh. The pinions H H are respectively attached to the ends of the shaft I, which shaft has journal-bearings at J J, formed in the respective sides of the vat. To one end of the shaft I is affixed a crank K, by which said shaft I and said gears H are rotated.

L is a pawl, which is connected at one end with the end of the vat at M, and its opposite end engages in the teeth of one of the pinions H, as shown in Fig. 1, whereby said pinions are locked at any point of adjustment desired.

When desirous to lower one end of the vat from the position shown in Fig. 1 to that shown in Fig. 3, the pawl L is disengaged from the pinion H, when said pinion is turned from right to left, whereby the legs D are drawn upward out of contact with the supporting-floor, when the end of the vat to which said adjustable legs are attached may be forced downward until the stationary legs E rest upon the floor, in which position it is obvious that the contents of the vat will flow to the discharge end of the vat and the vat will be retained by the gravity of its contents in such position. When, however, it is desirous to elevate the lower end of the vat from the position shown in Fig. 3 to that shown in Fig. 1, the movement of the pinions H are reversed, when said legs D will be forced downward and the lower end of the vat will be elevated to the position shown in Fig. 1, when it is retained in that position by throwing the pawl L back into the teeth of the pinion. To provide for overcoming any such friction as might arise by contact of the adjustable legs D with the sides of the legs E, two friction bearing rollers N N are affixed in recesses provided therefor in the legs D, one edge of said rollers N protruding far enough from its recess to bear against the stationary leg E, thereby preventing said legs D and E from being brought in contact.

Having thus described my invention, what I claim as new, and desire to secure by Letters Patent, is—

The combination of the vat A, central stationary pivotal legs C, stationary legs B, adjustable legs D, provided with toothed bars G, pinions H H, meshing in said toothed bars G and supported, respectively, upon the ends of the rotating shaft I, rotating shaft I, crank K, and retaining-pawl L, all substantially as and for the purpose specified.

In testimony whereof I affix my signature in presence of two witnesses.

ERNST WAGNER, JR.

Witnesses:
S. A. WOOD,
OSCAR JOHNSON.